United States Patent [19]

Ames et al.

[11] 3,879,352

[45] Apr. 22, 1975

[54] CONTINUOUS PROCESS FOR POLYMERIZING α,α-DISUBSTITUTED-β-PROPIOLACTONES

[75] Inventors: William A. Ames, Longview; James J. Ward, Henderson; Edward H. Carter, Jr., Longview, all of Tex.

[73] Assignee: Eastman Kodak Company, Rochester, N.Y.

[22] Filed: Feb. 6, 1973

[21] Appl. No.: 330,140

[52] U.S. Cl. .............................................. 260/78.3 R
[51] Int. Cl. ............................................ C08g 17/017
[58] Field of Search ............................... 260/78.3 R

[56] References Cited
UNITED STATES PATENTS

| | | | |
|---|---|---|---|
| 3,560,450 | 2/1971 | Curotti.............................. | 260/78.3 |
| 3,578,700 | 5/1971 | Klootwijk et al. ................ | 260/78.3 |
| 3,773,726 | 11/1973 | Vollkommer et al. ......... | 260/78.3 R |

FOREIGN PATENTS OR APPLICATIONS

| | | |
|---|---|---|
| 1,149,148 | 4/1969 | United Kingdom |

*Primary Examiner*—Morris Liebman
*Assistant Examiner*—E. A. Nielsen
*Attorney, Agent, or Firm*—Edward R. Weber; Daniel B. Reece, III

[57] ABSTRACT

A polymer of an α,α-disubstituted-β-propiolactone may be formed by contacting the monomer of the α,α-disubstituted-β-propiolactone, a suitable polymerization initiator, and solid particles of the polymer of the α,α-disubstituted-β-propiolactone in the presence of an inert atmosphere in a suitable reactor at an elevated temperature. Polymerization of the monomer upon the walls of the polymerization reactor is inhibited by controlling the average particle size of the polymer particles by removing a portion of the polymer particles from the reactor, grinding these particles to a smaller particle size, and returning the smaller particles to the reactor.

16 Claims, 1 Drawing Figure

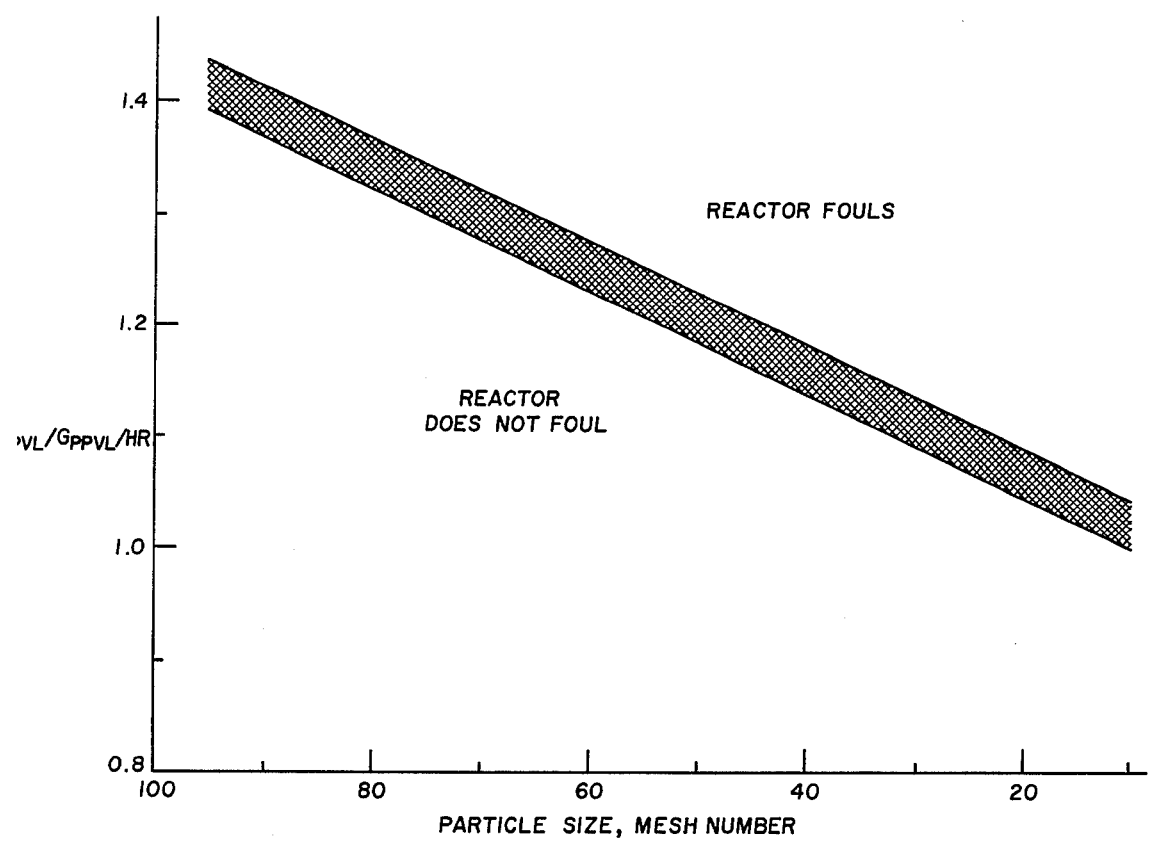

CONTINUOUS PROCESS FOR POLYMERIZING α,α-DISUBSTITUTED-β-PROPIOLACTONES

This invention relates to a process for polymerization of α,α-disubstituted-β-propiolactones. More particularly, this invention relates to a continuous process for the bulk polymerization of the α,α-disubstituted-β-propiolactones.

It is well-known that β-lactones are important as intermediates for the production of synthetic chemicals, polymer products, pharmaceuticals, and the like. The α,α-disubstituted-β-propiolactones are of particular interest in the high polymer industry since they can be used as starting materials for the production of synthetic resins and fibers which have many novel and desirable properties. Since the polymerization reaction of these β-lactones is exothermic, their polymerization gives rise to an appreciable temperature increase in the polymerizing mass. This temperature increase is apt to lead to decomposition of the monomer and/or the polymer formed. Many methods have been proposed for polymerization of these β-lactones without this undesirable temperature increase. Most involve some variation of using an inert diluent to absorb the exothermic heat.

British Patent No. 1,149,148 discloses a method of polymerizing β-lactones in the absence of an inert diluent. According to the aforementioned British patent, the undesirable temperature increase can be overcome if the polymerization of the β-lactone is carried out in the presence of solid particles of a polymer of the β-lactone which are kept in vigorous motion in an inert gaseous atmosphere. Inert gases are defined as gases which neither react with the components present in the polymerizing mixture, nor interfere in the polymerization reaction. Examples of eligible inert gases are carbon dioxide, nitrogen and preferably air. Volatile saturated hydrocarbons having a boiling point below 50°C. such as propane, butane, isobutane, or 2-methylbutane are also suitable. The British patent further characterizes the process as continuous, and alleges that an equilibrium particle size is attained during extended runs. The most protracted run described in the patent, however, is 7 hours. Furthermore, the British patent makes no mention of the characteristics of the polymer obtained. Thus, it is impossible to ascertain whether the polymer is suitable for high quality uses such as film or fiber manufacture.

To be useful for the fabrication of fibers and/or film, it is desirable that the polymer have an inherent viscosity of from about 1.2 to about 2.0.

For use as a molding plastic, the inherent viscosity should be from about 1.2 to about 4.0 or higher. The term "inherent viscosity" as used herein is defined as the polymer property determined in accordance with the following relationship:

$$\eta\text{inh} = (\ln \eta\text{rel})/c$$

wherein the relative viscosity, $\eta_{rel}$, is calculated by dividing the flow time in a capillary viscometer of a dilute solution of the polymer by the flow time for the pure solvent, and $c$ is the concentration of the polymer in the solvent. I.V. values in this specification were determined at 25°C. using a concentration of 0.5 g. of polymer per 100 ml. of solvent. The solvent was a 60/40 mix by weight of phenol and 1,1,2,2-tetrachloroethane.

Experimental attempts to utilize the disclosure of the British patent for the production of high quality polymer suitable for use in the fabrication of film or fibers have revealed that the process is not truly a continuous process. For example, when polymer with an I.V. of 1.2 to 3.0 was prepared using the process of the aforementioned British patent, particle size continued to increase throughout the polymerization. When a lower I.V. polymer is made, the particle size generally does not grow. The particular I.V. at which polymer particle growth increases with conversion is not known, however, it is somewhere in the range of 0.6 to 1.2. It was found that at I.V.s of 0.6 and lower the particle size did not increase, and that the polymer is brittle. The particle size of the low I.V. polymer probably does not increase because of the shearing action of the stirrer against the particles and of the particles against other particles. It is therefore apparent that either the inventors of the process of the subject British patent did not operate the process sufficiently long to indicate that particle size equilibrium was not established or that a low I.V. polymer was being produced.

Likewise, the British patent does not indicate that reactor fouling is a problem. Experimental work in attempting to apply the disclosure of the British patent to commercial operations showed it to be a very serious problem, of sufficient magnitude to prevent the process from being characterized as continuous. When pivalolactone monomer polymerizes on a reactor surface, a deposit forms which clings to the surface and continues to grow until it completely fouls the reactor. The growth increases in size because the deposited polymer contains active chain propagating sites which encourage the polymerization of additional monomer. The deposited polymer clings tenaciously to the reactor surface and is extremely difficult to remove. Burning or soaking in concentrated acid is often necessary to remove the polymer deposits.

Therefore, it is an object of this invention to provide a process for continuous bulk polymerization of α,α-disubstituted-β-propiolactones.

Another object of this invention is to provide a process for the continuous bulk polymerization of α,α-disubstituted-β-propiolactones wherein the fouling of the reactor through polymerization of the β-propiolactone on the reactor wall is eliminated or at least markedly reduced.

These and other objects and advantages of this invention will become apparent from the following description and appended claims.

It has been discovered that the α,α-disubstituted-β-propiolactones, of which pivalolactone is a good example, can be continuously bulk polymerized in a powder bed process to yield high I.V. polymer by controlling the average particle size of the polymer contained in the polymerization reactor. This is most readily accomplished by grinding and recycling a portion of the polymer product of the reactor. Since, as previously discussed, it has been determined that fresh polymer contains active chain propagating sites which encourage polymerization of additional monomer, it is concluded that polymerization occurs largely on the surface of the polymer particles, and that this is the reason for the particle size increase. As the particles grow, the ratio of the surface area of the particles (where it is desirable for polymerization to occur) to the surface area of the reactor (where polymerization leads to fouling) decreases. In other words, for any particular rate of addition of monomer, the probability of polymerization on the reactor surface, with consequent fouling of the reactor, increases as the individual size of the polymer particles grow.

Grinding and recycling of a portion of the polymer product maintains a high particle surface area with consequent high ratio of particle surface area to reactor surface area, and encourages the polymerization of the monomer on the particles rather than on the reactor walls. The amount of polymer recycled to the reactor will vary depending upon the reactor configuration, particle size, and monomer feed rate. In general, from 10 to 50 percent of the polymer in the reactor may be removed, ground to a smaller mesh size, and recycled to the reactor. This recycled polymer should generally be 40 mesh or smaller. A preferred range would be through 40 mesh and on 80 mesh. When mesh is referred to we mean Tyler standard screen scale sieves.

Alternatively, the feed rate of monomer could be decreased as the particle size increases. This would reduce the tendency for the reactor to foul, but would not be commercially feasible because the reactor output would be continuously decreased. In addition, the process would constantly be approaching reactor fouling conditions as the particle size continuously increases.

The type of mill used to reduce the particle size of the polymer is immaterial. Any mill capable of providing particles in the desired size range may be utilized. Likewise, no particular importance is attached to the method by which polymer particles are withdrawn from or added to the reactor. A convenient procedure is to withdraw the polymer particles from a discharge port near the bottom of the reactor, and to add the ground particles to the top of the reactor particle bed.

Very pure monomer is desirable to operate this process on a continuous basis. Monomer of suitable quality can be obtained by procedures described in copending application Ser. No. 208,906, filed Dec. 16, 1971 now U.S. Pat. No. 3,825,573, issued July 23, 1974. Use of high purity monomer allows the reactor to be operated at high rates, since the high purity monomer will polymerize more rapidly and thus large amounts of unreacted monomer will not accumulate in the reactor. Excessive amounts of monomer in the reactor due to too rapid addition of the monomer or low purity of the monomer contribute to reactor fouling.

In addition to faster operating rates, the high purity monomer yields a higher quality polymer which is more suitable for commercial use as films, fibers, or as a bulk molding polymer. In contrast to the aforementioned British patent, which discloses at page 2, lines 115–123 that the polymer particles removed from the reactor still contain unreacted monomer and suggests a post-curing state to polymerize this material, we have found that when operated in accordance with our invention, utilizing high purity monomer, the post-polymerization step suggested by the British reference is not required.

Although the process has been described as a bulk process, it should be understood that small quantities of initiator solvents or chain transfer agents may be used. Numerous initiators are known to be effective for polymerizing $\beta$-propiolactones. These initiators include phosphines, amines, alkali metals, $BF_3$ etherate, and certain salts. Preferred initiators are the tetraalkylammonium halides and carboxylates. Initiator concentrations will vary depending on the activity of the initiator and the desired I.V. of the product. Initiator concentrations varying from 0.0001 mole percent to 2.0 mole percent, based on the amount of monomer, may be utilized. A preferred amount is from about 0.005 to about 0.5 mole percent.

Monomer and initiator should not be mixed until shortly before they are charged to the reactor. Furthermore, they should not be heated prior to charging to the reactor. Both of these steps are necessary to prevent premature polymerization of the monomer. The monomer-initiator mixture may be pumped into the reactor with one or more metering pumps through one or more entry ports into the reactor. If desired, premixing of the monomer and initiator may be omitted and they may be added separately to the reactor. The number of reactor ports is a function of the reactor configuration. The ports should be distributed throughout the reactor diameter so as to promote uniform distribution of the monomer over the polymer particles contained within the reactor. Stirrer speed necessarily depends largely on the reactor and stirrer configurations, the determining consideration being that the polymer particles are continuously circulated so that an excessive concentration of monomer does not build up at localized spots in the reactor.

Polymerization can be conducted with bed temperatures of from about 50° to about 150°C., but a preferred operating range is from about 70° to about 120°C. At temperatures much above 150°C., decomposition of the monomer will begin. At temperatures below 50°C., the polymerization reaction will be so slow as to be impractical. If desired, the polymerization process may be conducted in a multi-stage process with the two stages being operated at different temperatures. Generally, it will be preferable to operate the first stage at a lower temperature, and increase the temperature in succeeding stages. Monomer feed rate is a function of the reactor configuration and the average polymer particle size within the reactor. The FIGURE illustrates this relationship for a particular laboratory size reactor.

The reactor design is likewise not found to be a limiting factor in the operation of this invention. It is preferable, however, that the stirrer be designed in such a way as to impart a top-to-bottom circulation to the polymer particles within the bed as well as a radial circulation. For uniformity, the stirrer-reactor configuration should also be such that no dead spots occur within the bed wherein uncirculated particles tend to remain. A high ratio of reactor diameter to particle bed depth gives most desirable results. Monomer addition should be controlled so that complete polymerization takes place before the monomer reaches the bottom of the particle bed.

This invention will be further illustrated by the following examples. It will be understood that these examples are included merely for purposes of illustration and are not intended to limit the scope of the invention in any way.

EXAMPLE 1

A Pyrex glass reactor 9 inches in diameter, 6 inches deep at the sides, and 7 inches deep at the center is charged with 1090 grams of finely divided polypivalolactone. The top of the reactor is a metal plate with a stirrer seal assembly mounted in the center. The stirrer is a ¼-inch stainless steel rod with two blades, 7 inches long, ¾-inch wide, and ⅛-inch thick, attached to the bottom of the rod and mounted perpendicularly to each other. Another set of blades is mounted 2.5 inches above the lower set. All of the blades are pitched at a 45° angle.

The polymerization is conducted at 110°C. The reactor is heated by circulating hot oil.

The polymerization index of the monomer used in the study varies from a low of 6 seconds to a maximum of 20 seconds. Polymerization index is the time in seconds required for 100 mmole of pivalolactone containing 0.05 mmole of tetrabutylammonium iodide to begin polymerizing at 100°C.

A total of 0.05 mmole of tetrabutylammonium iodide initiator is used per mole of lactone. Monomer-initiator solution is pumped into the reactor at the rate of 134 grams per hour for 39.5 hours. Product is removed through an outlet in the bottom of the reactor.

After 11 hours of operation the particles have become noticeably larger. They are ground to pass a 40 mesh sieve after 16 hours of operation and recycled to the reactor. Particle growth continues throughout the polymerization.

The I.V. of the polymer measured in 60/40 phenol/tetrachloroethane at 25°C. is 1.7 to 1.9. The yield of product is 81.5 percent.

EXAMPLE 2

The objective of this experiment is to determine the maximum amount of monomer per gram of polymer powder per hour which can be pumped into the reactor before fouling begins to occur for different particle sizes of polymer powder. Particles are separated into various size ranges by standard mesh sieves. Fouling is considered to be the formation of hard polymer deposits on the interior reactor surface since it is known that once these deposits form they will continue to polymerize additional monomer, because of the active chain propagating sites present, until the growth is sufficiently large to stop the process.

A single-stage reactor consisting of a 2-liter resin flask is used to obtain the data used in constructing the FIGURE. The flask has a 1-inch opening drilled in the side about 5 inches above the bottom for removal of polymer. The stirrer configuration is similar to that used in Example 1 but is smaller.

In this study, trial and error experiments are conducted to establish the approximate rate of addition (of monomer per hour) per gram of polymer in the reactor necessary to just begin fouling the reactor. Once this is established, rates slightly higher and slightly lower are checked to determine as closely as possible what the maximum rate without fouling and the minimum rate with fouling would be. This is done for various particle sizes of polymer.

A definite amount of monomer is charged to the reactor in each experiment. It is found that 4.44 grams of monomer per gram of polymer initially in the reactor is a convenient amount. This amount is sufficient to show when fouling occurs, but is not so much that the experiments have to be operated over long periods of time.

The FIGURE is plotted from data obtained from these experiments. The line is drawn as a broad line because of the difficulty in determining exactly where fouling first begins to occur. The line may be considered as a boundary between fouling and nonfouling areas.

The following experiments describe: (A) a condition where fouling occurred, and (B) a condition where fouling did not occur.

EXPERIMENT A - REACTOR FOULING

Two hundred fourteen grams of polypivalolactone powder having particle sizes between 10 and 20 mesh are charged to the reactor. It is heated by a constant temperature bath to 105°C.

The monomer used in this study has a polymerization index of 6 seconds. 0.05 Mmole of tetrabutylammonium iodide initiator solution is used per mole of monomer. Monomer and initiator are mixed and pumped into the stirred reactor at a rate of 237 grams per hour. A total of 949 grams of monomer is added. The reactor is opened and examined. Hard deposits of polymer are found on the walls and bottom of the reactor.

Therefore, at the rate of 1.11 grams of monomer per gram of polymer powder per hour the reactor begins to foul when 10 to 20 mesh particles are used as the powder bed.

EXPERIMENT B - REACTOR NOT FOULED

The experiment is repeated using 80 mesh average particle size polymer in the powder bed. Two hundred eighty-seven grams of the finely divided powder is required to fill the reactor to the same volume as in the previous experiment. More powder is required than in the previous experiment because the bulk density of the smaller particle size powder is greater than that of the larger particle size polymer. A total of 1275 grams of 6 second monomer is charged into the reactor over a period of 3 hours and 18 minutes. The rate of addition is 386 grams per hour.

After all of the monomer-initiator solution has been charged to the reactor it is opened and examined. No hard deposits have formed on the bottom or sides of the reactor. Therefore, at the rate of 1.30 grams of monomer per gram of polymer per hour, the reactor does not foul when 80 mesh average particle size polymer is used as the powder bed.

The FIGURE shows that the smaller particle size polypivalolactone powder can accommodate a higher monomer feed rate than the larger particles can. Hence, it is important to keep the particle size small if high rates are to be maintained without fouling the reactor.

EXAMPLE 3

This example shows how particle growth eventually results in reactor fouling to the point where the process can no longer be operated.

The reactor utilized in this experiment is a two-stage one. The first stage is the 2-liter resin flask of Example 2. A connecting tube from this flask to a second flask attaches the two stages together. The second stage has a polymer discharge outlet in the side. Both stages are fitted with nitrogen bubblers and stirrers and are heated to 110°C. by constant temperature baths.

Two hundred grams of polypivalolactone powder is charged to the first stage. Monomer-initiator solution is charged at the rate of 60 grams per hour. The particle size increases noticeably during the polymerization. As the first stage fills, polymer overflows into the second stage. As the second stage fills, polymer is removed through the discharge tube.

Polymer particles are not ground and recycled during the experiment, but are allowed to continue to grow. After 49 hours, the particles are so large and the fouling so heavy on the walls that the stirrer cannot operate. The first stage is badly fouled.

EXAMPLE 4

The two-stage reactor of Example 3 is used. The first stage is heated to 80°C. and the second to 110°C.

Two hundred sixty grams of polypivalolactone powder is charged to the first stage. Monomer-tetrabutylammonium iodide initiator in a mole ratio of 20,000 to 1 is pumped into the reactor at the rate of 110 grams per hour. Polymer from the first stage overflows into the second stage. Polymer from the second stage discharge is ground to pass a 40 mesh sieve. After 16 hours of operation some of the polymer in the first stage is replaced by the ground polymer. About 20 percent of the first stage powder volume is replaced every 2 to 4 hours or as needed. Total reaction time is 44 hours.

The reactor does not foul. Conversion to polymer is 92 percent. The I.V. of the product measured in 60/40 phenol/tetrachloroethane at 25°C. is 1.7 to 1.9.

The following examples illustrate the growth of particle size experienced when the process of British Patent No. 1,149,148 is practiced.

EXAMPLE 5

The reactor of Example 1 is used. Seven hundred eighty-two grams of polymer powder is charged to the reactor. Monomer containing 0.03 mole percent of triphenylphosphine initiator is added at the rate of 190 grams per hour. Contrary to the British claim regarding establishment of particle size equilibrium, we observe that the particles continue to grow with time as shown in Table I.

After 11 hours and 45 minutes, polymer has begun to stick on the bottom and sides of the reactor. It is in the process of fouling.

TABLE I

Sieve Analysis of Polypivalolactone Powder

| Particle Size | Initial Reactor Charge Wt. % | Size After 5.5 Hr. Wt. % | Size After 8.5 Hr. Wt. % | Size After 11.75 Hr. Wt. % |
|---|---|---|---|---|
| On 10 Mesh | 13.0 | 35.2 | 83.5 | 92.3 |
| 10–20 Mesh | 40.6 | 56.2 | 12.9 | 4.7 |
| 20–30 Mesh | 24.2 | 7.3 | 1.6 | 1.8 |
| 30–50 Mesh | 17.6 | 1.3 | 1.6 | 0.1 |
| 50–60 Mesh | 1.7 | — | — | 0.1 |
| 60–100 Mesh | 2.3 | — | 0.4 | 0.3 |
| Thru 100 Mesh | 0.6 | — | — | 0.6 |

EXAMPLE 6

The reactor described in Example 1 is used. It is charged with 788 grams of polypivalolactone powder. The reactor is heated to 100°C. Monomer containing tetrabutylammonium iodide is pumped into the reactor at the rate of 275 grams per hour. Monomer-to-initiator mole ratio is 20,000 to 1. At various intervals during the polymerization, polymer is removed and the particle sizes are determined by sieve analysis. The results are shown in Table II.

After 14 hours, the reactor has begun to foul badly.

TABLE II

Sieve Analysis of Polypivalolactone Powder

| Particle Size | Initial Reactor Charge Wt. % | Size After 7 Hr. Wt. % | Size After 10 Hr. Wt. % | Size After 12 Hr. Wt. % |
|---|---|---|---|---|
| On 10 Mesh | 13.0 | 13.6 | 12.9 | 87.8 |
| 10–20 Mesh | 40.6 | 81.0 | 84.3 | 8.7 |
| 20–30 Mesh | 24.2 | 4.6 | 2.1 | 2.8 |
| 30–50 Mesh | 17.6 | 0.4 | 0.6 | 0.7 |
| 50–60 Mesh | 1.7 | — | — | — |
| 60–100 Mesh | 2.3 | — | — | — |
| Thru 100 Mesh | 0.6 | — | — | — |

The invention has been described in detail with particular reference to certain preferred embodiments thereof, but it will be understood that variations and modifications can be effected within the spirit and scope of the invention.

We claim:

1. In a process for the preparation of a polymer of an α,α-dialkyl-β-propiolactone which process comprises polymerization of the said α,α-dialkyl-β-propiolactone in contact with a polymerization initiator and in the presence of solid particles of polymer of the said α,α-dialkyl-β-propiolactone wherein said particles are kept in vigorous motion in an inert gaseous atmosphere, the improvement which comprises controlling the average particle size of the polymer particles within the reactor by removing a portion of the polymer particles from the reactor, grinding said particles to a smaller particle size, and returning said smaller particles to the reactor.

2. The process of claim 1 wherein the polymerization is conducted at a temperature of from about 50° to about 150°C.

3. The process of claim 2 wherein the temperature is from about 70° to about 120°C.

4. The process of claim 1 wherein the amount of polymer recycled to the reactor is from about 10 to about 50 percent of the polymer in the reactor.

5. The process of claim 1 wherein the particle size of the polymer recycled to the reactor is less than about 40 mesh.

6. The process of claim 5 wherein the particle size of the recycled polymer is greater than 80 mesh and less than 40 mesh.

7. The process of claim 1 wherein the polymerization is conducted in at least two sequentially connected reactors.

8. The process of claim 7 wherein the temperature of each successive reactor is higher than the temperature in the preceding reactor.

9. In a process for the preparation of a polymer of α,α-dimethyl-β-propiolactone which process comprises polymerization of said α,α-dimethyl-β-propiolactone in contact with a polymerization initiator and in the presence of solid particles of polymer of the said α,α-dimethyl-β-propiolactone wherein said particles are kept in vigorous motion in an inert gaseous atmosphere, the improvement which comprises controlling the average particle size of the polymer particles within the reactor by removing a portion of the polymer particles from the reactor, grinding said particles to a smaller particle size, and returning said smaller particles to the reactor.

10. The process of claim 9 wherein the polymerization is conducted at a temperature of from about 50° to about 150°C.

11. The process of claim 10 wherein the temperature is from about 70° to about 120°C.

12. The process of claim 9 wherein the amount of polymer recycled to the reactor is from about 10 to about 50 percent of the polymer in the reactor.

13. The process of claim 9 wherein the particle size of the polymer recycled to the reactor is less than about 40 mesh.

14. The process of claim 13 wherein the particle size of the recycled polymer is greater than 80 mesh and less than 40 mesh.

15. The process of claim 9 wherein the polymerization is conducted in at least two sequentially connected reactors.

16. The process of claim 15 wherein the temperature of each successive reactor is higher than the temperature in the preceding reactor.

* * * * *